Nov. 13, 1934.  G. R. SCOTT  1,980,444
METHOD AND MEANS OF PRODUCING HOBS
Filed Oct. 10, 1931   4 Sheets-Sheet 1

INVENTOR
George R. Scott.
BY
Hames, Dickey, Pierce & Haun.
ATTORNEYS.

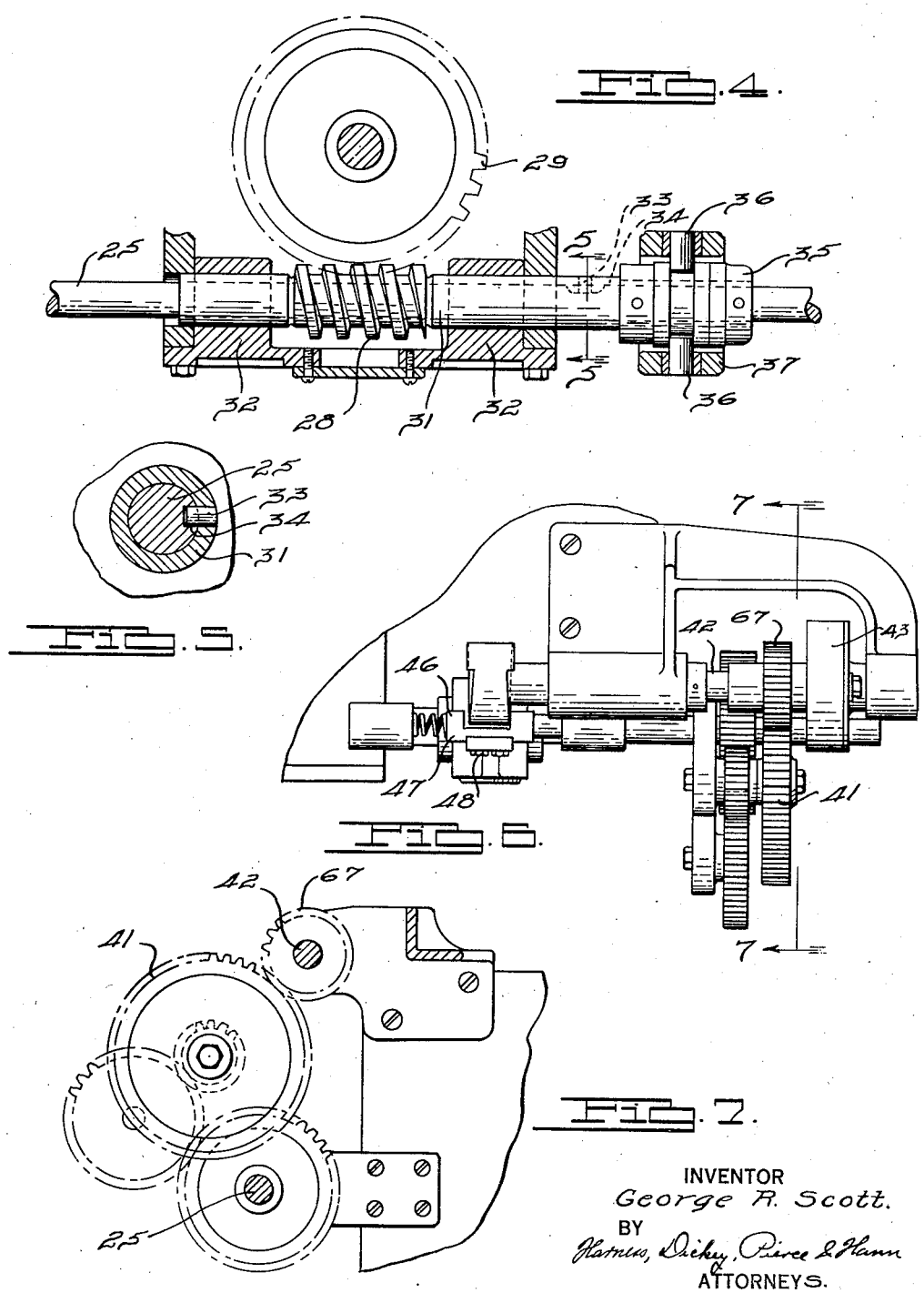

Nov. 13, 1934.  G. R. SCOTT  1,980,444
METHOD AND MEANS OF PRODUCING HOBS
Filed Oct. 10, 1931  4 Sheets-Sheet 3
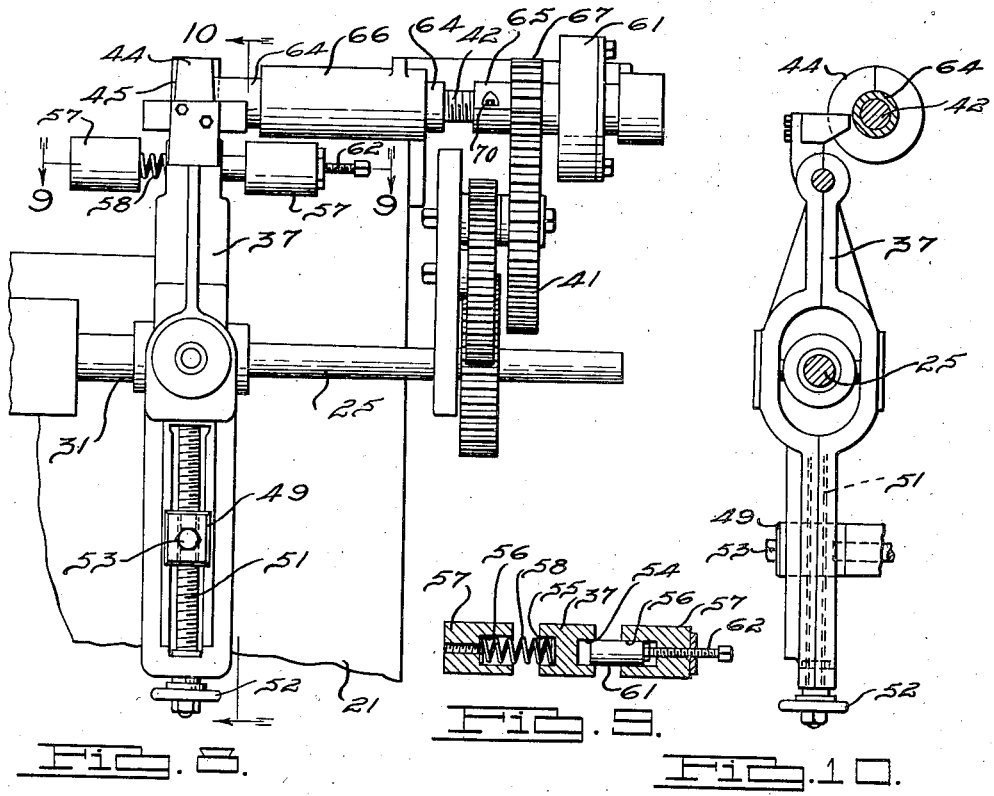
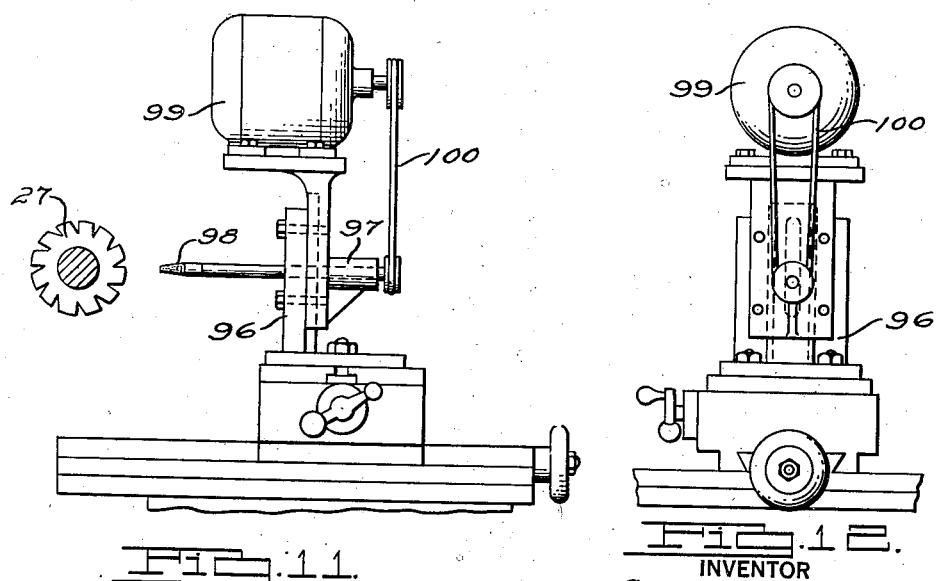
INVENTOR
George R. Scott.
BY
Harness, Dickey, Pierce & Hann.
ATTORNEYS.

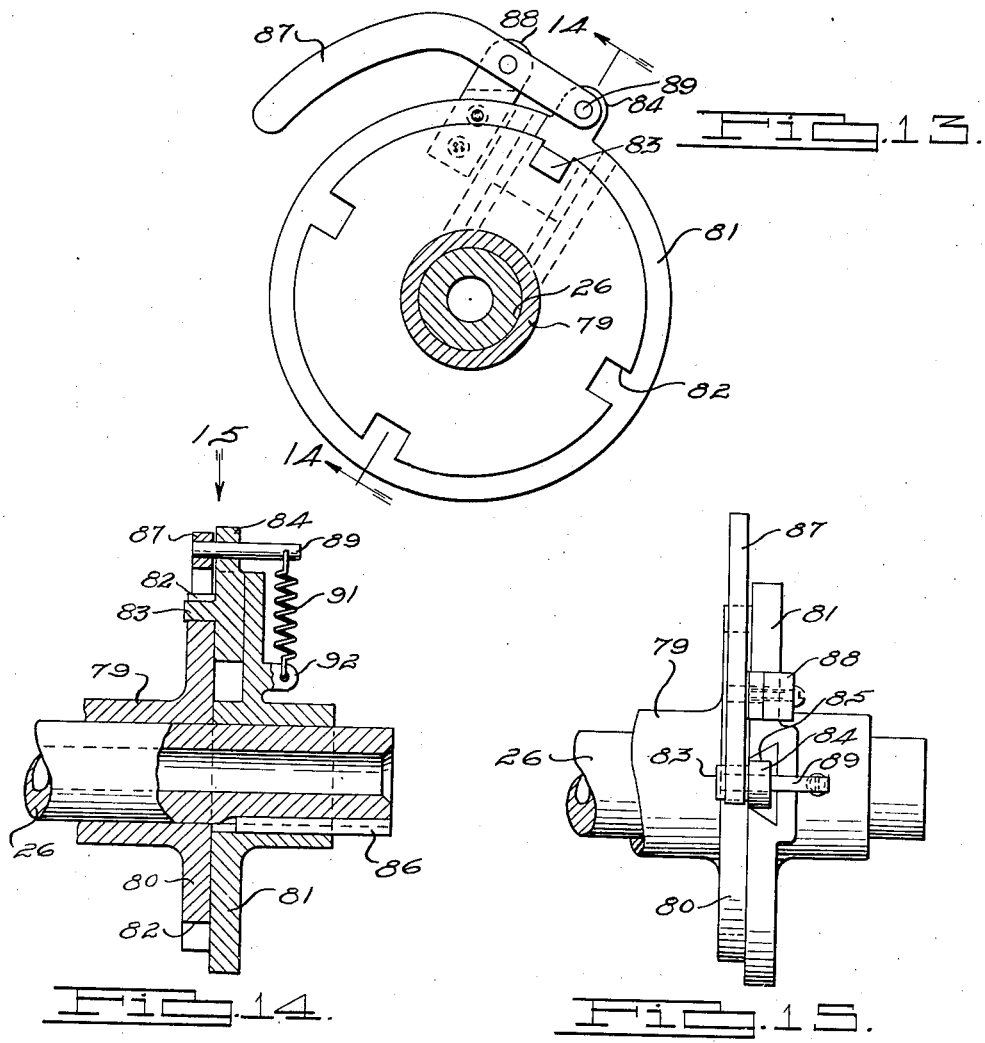

Patented Nov. 13, 1934

1,980,444

UNITED STATES PATENT OFFICE 1,980,444

METHOD AND MEANS OF PRODUCING HOBS

George R. Scott, Norfolk, Va.

Application October 10, 1931, Serial No. 568,031

19 Claims. (Cl. 82—12)

This invention relates to methods of, and machines for, producing cutting tools and particularly to a method of and a machine for producing a hob of an enveloping type having relieved or "backed off" teeth which shall precisely generate teeth on a worm wheel having exact mating capacity with the corresponding worm even after repeated sharpenings of the hob, the teeth of which have such form as to produce worm wheels whose tooth flanks follow the natural conformity of the said worm in its passage through the wheel, resulting in greatly improved mating capacity and thereby increasing the efficiency and load carrying capacity of the gear set so produced.

The main objects of this invention are to provide a method of and a machine for producing hobs of the above mentioned type, comprising a former which shall first generate the gap between the threads on the envelope hob to a depth substantially equal to the height of the thread thereof; to provide means on the machine for angularly enlarging the groove to form the sides of the thread; to provide an advancing and/or retracting device to the former supporting portion of the table which moves the former in such manner as to effect a relief to the front cutting edge of the teeth of the hob, the thread of which has been previously fluted in any conventional manner to form the teeth; to provide an indexing head for the supporting elements of the hob so that the engagement between the thread and the former may be changed relative to the periphery of the work piece when multiple threaded hobs are to be produced; to provide a former in the nature of a grinding wheel for forming the relieved side of the teeth, after hardening, to accurate dimensions; and to provide a machine which is simple in operation and construction and which produces a hob which, while having any desired relief, may be repeatedly resharpened and still retain its form thereby providing a hob capable of generating worm wheels having accurate mating capacity and substantially constant characteristics throughout its entire life. It will be noted that this process differs from the one at present used in which case the same form is present as regards the cutting edges after sharpening. Such a method of relief would be fatal to a globoidal hob as the aspect of the worm thread changes throughout the length of the worm.

Other objects and features of novelty of my invention will either be specifically pointed out or will become apparent when referring, for a better understanding of my invention, to the following description in conjunction with the accompanying drawings, wherein—

Fig. 4 is an enlarged sectional view of the structure illustrated in Fig. 1, taken on the line 4—4 thereof;

Fig. 5 is an enlarged sectional view of the structure illustrated in Fig. 4, taken on the line 5—5 thereof;

Fig. 6 is an enlarged broken plan view of the machine illustrated in Figure 1;

Fig. 7 is a sectional view of the structure illustrated in Fig. 6, taken on the line 7—7 thereof;

Fig. 8 is a view, in elevation, of the structure illustrated in Fig. 6;

Fig. 9 is a sectional view of the structure illustrated in Fig. 8, taken on the line 9—9 thereof;

Fig. 10 is a sectional view of the structure illustrated in Fig. 8, taken on the line 10—10 thereof;

Fig. 11 is an elevational view of a grinding attachment which may be substituted for the cutting tool illustrated in Fig. 1, for dressing the flanks of the teeth of the hob in accordance with my invention;

Fig. 12 is an end view of the structure illustrated in Fig. 11;

Fig. 13 is an enlarged view, partly in section, of the indexing head illustrated in Fig. 1;

Fig. 14 is a sectional view of the structure illustrated in Fig. 13, taken on the line 14—14 thereof;

Fig. 15 is a plan view of the structure illustrated in Fig. 13;

Fig. 16 is an end view of a cutter having threads thereon which were generated by my machine, and Fig. 17 is a plan view of the structure illustrated in Fig. 16.

Figure 1:
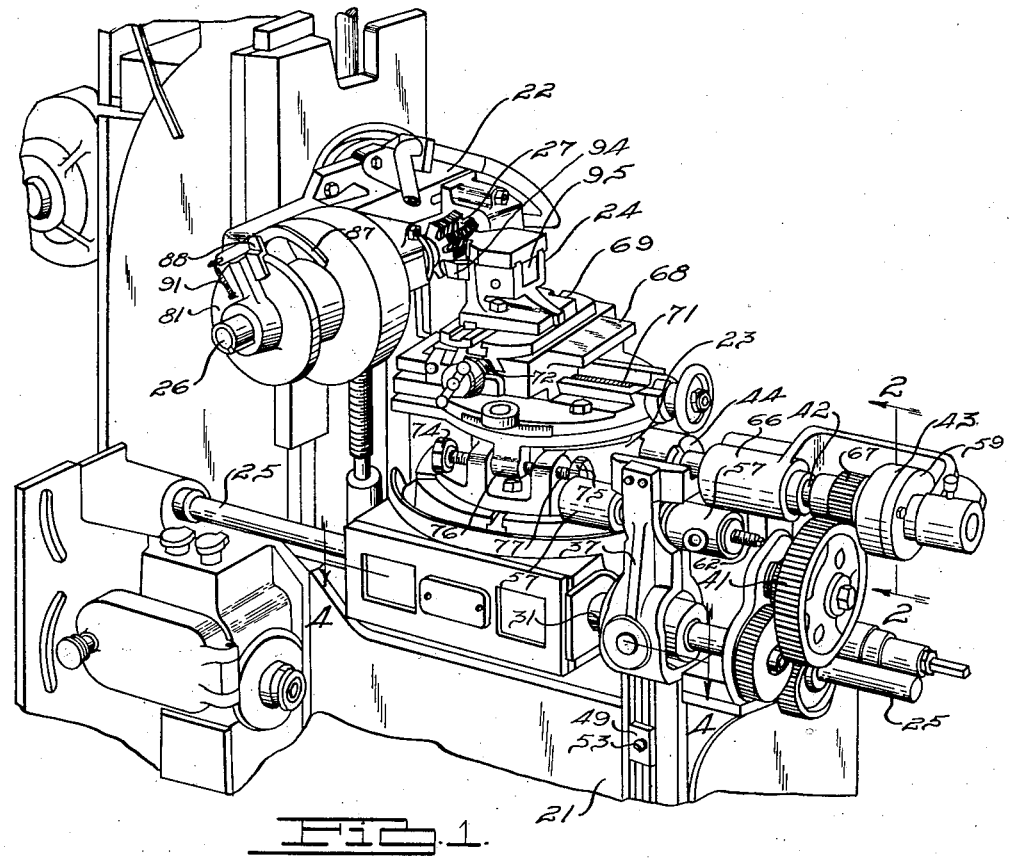
Figure 1 is a broken perspective view of a hob producing machine embodying features of my invention.

Referring to Fig. 1, I have illustrated machine 21, in connection with a conventional hobbing machine having a vertically adjustable work supporting mechanism 22 and a rotatable horizontally disposed table 23 for adjustably supporting a tool holding device 24. Suitable driving mechanism (not shown) is employed for driving shafts 25 and 26 for respectively rotating the table 23 and the work 27 at predetermined relative speeds. The mechanism for effecting the relative rotation of the table and work have been utilized in conjunction with the type of machine illustrated and have not been shown and described since the interconnected driving means for effecting the relative rotation is well known in the art.

In the co-pending applications of Samuel I. Cone, Serial Number 188,214, filed May 2nd, 1927, and Serial Number 466,798, filed July 9, 1931, the method of and apparatus for producing globoidal worm wheels and worms and the new type of hob as a cutting tool respectively, is described and claimed in which the tooth flanks of the hob and the worm wheel, when viewed in its midplane, have sides which are tangent to the same base circle.

The hob, so described for cutting teeth in a worm wheel, is provided with a thread which is of less thickness than the gaps between the finished teeth of the worm wheel and having sides which are of exact mating capacity with the sides of the teeth to be cut. The centers of rotation of the hob and work piece are advanced to cut a predetermined depth of groove in the worm wheel, then shifted in such manner as to effect a finishing feed to generate the sides of the teeth of the worm wheel with the cutting edges of the hob, while the worm wheel and the hob are maintained on fixed centers, exact mating capacity with a worm resulting. The thread of the worm is the same as regards mating capacity as that of the hob.

The present invention relates to a method of and a machine for producing said hob by introducing in increments a succession of advancing and/or retracting motions to the former which gradually slopes the sides of the teeth away from the cutting edges to provide a relief thereto, it being well known that said relief is essential to good cutting qualities.

Referring to Figs. 1 and 4, the shaft 25 drives the table 23 through a worm 28 and worm wheel 29 in the conventional manner. In the present construction, the worm 28 is a part of a hollow shaft 31 which is supported in bearings 32 for longitudinal movement on the shaft 25. A key 33 is carried by the shaft 25 which registers in a groove 34 on the inner surface of the hollow shaft 33 for the purpose of driving the shaft 31 from the shaft 25. For positioning the hollow shaft 31 longitudinally of the shaft 25 I have provided a slotted collar 35 in which a pair of pins 36 register when extending inwardly from the sides of an opening provided in a member 37. When the member 37 is retained in fixed normal position the operation of the table 23 through the worm 28 and worm wheels 29 is effected in the conventional manner. However, when the member 37 is oscillated on its supporting pivot, the movement of the table in rotation is advanced or retracted from the normal rotation thereof for a purpose which will be explained hereinafter.

In Figs. 6, 7, 8 and 9, I have illustrated means for effecting the oscillation of the member 37 which includes a train of gears 41 which is employed for driving a shaft 42 through a rack and pawl device 43 and for rotating a cam member 44 which is mounted on the outer end of the shaft in alignment with the member 37. The cam 44 is provided with sloping surfaces 45 on each of its sides, either one of which may be in engagement with a flanged end 46 of a member 47 which is retained by bolts 48 on the end of the member 37. The member 37 is provided with a pivot 49 which is adjustable, relative to the member 37 and the machine 21, for changing the amount of longitudinal motion effected to the hollow tubular member 31 by the constant degree of movement of the member 47, effected by the sloping surfaces 45 of the cam. A lead screw 51 supports the member 37 on the pivot 49 and may be turned by a hand wheel 52 for adjusting the vertical position of the center 49 relative to the machine 21. A stud 53 is provided for clamping the center in fixed position relative to the member 37 after it has been adjusted to provide a predetermined throw to the member. The pivot 49 oscillates about the shaft 50 which is mounted on a hub that is slidable on a track (not shown) provided on the face of the machine bed 21.

Referring to Fig. 9, the body portion of the member 37 is provided with recesses 54 and 55 which are aligned with recesses 56 provided in members 57 which are disposed on either side of the members 37. A spring 58 is mounted in recesses 55 and 56 and a block 61 spans the recesses 54 and 56 in which it is adjustably positioned by a screw 62 relative to a fixed member 57. In this construction the member 37 is biased to the right, as viewed in Figs. 8 and 9, by the spring 58 to retain the inner surface of the left hand flange 46 of the member 47 in contact with the left hand side of the cam 44. When the shaft 25 is rotated in a clockwise direction, as viewed in Fig. 10, the table 29 is moved in a counter-clockwise direction when viewed from above, through the engagement of the worm 28 with the worm wheel 29. As the shaft 25 continues to rotate the cam 44 is rotated at a predetermined speed, regulated through the train of gears 41, to effect the oscillation of the member 37 to the left. This oscillation is effected through the engagement of the sloping surface 45 with the surface of the flanges 46 which moves the member 37 against the bias of the spring 58 and is returned to normal position by the bias of the spring at the end of each revolution of the cam. The movement of the shaft 31 to the left, effected by the member 37 through the engagement of the pins 36 with the slotted collar 35, periodically changes the normal rotation of the wheels 29 and table 21 at predetermined points in its movements of rotation for a purpose which will now be explained.

As pointed out above when the machine is employed for "backing off" teeth on hobs, the sides thereof are relieved from the front cutting edges away from the normal lead of the thread or tooth side to relieve the side from contact with the flanks on the worm wheel to be cut. The normal position of the tool or grinding element at the cutting edge of the teeth is that at which the member 37 is biased to its normal or its furthermost position to the right and as the hob is turned toward the cutter, through the rotation of the shaft 26, the sloping surface 45 of the cam 44 retracts the rotation of the cutter to machine the right hand flanks of the teeth inwardly from the initial helical form and rearwardly of the cutting edges to provide relief thereto.

As will be noted in Figs. 1, 16 and 17 the hob is provided with a plurality of flutes which may be disposed parallel to the axis of the hob or normal to its thread to cut the thread into a plurality of teeth. The cutting edge of each tooth is at the junction of the flute with the gap of the thread and the sides are cut away rearwardly from the front cutting edges. The cam is so constructed and geared as to revolve once during the passage of the cutter across the surface of each tooth to effect the slope of the flank of the tooth rearwardly of the cutting edge and inwardly of the side of the tooth as defined by the lead of the thread.

After the former has passed over one tooth the flange 46 of the member 47 is biased to the right by the spring 58 to return the former to normal position at the cutting edge of the next adjacent tooth and to thereafter move the former inwardly of the side as defined by the lead of the thread, to relieve the cutting edge of the next adjacent tooth. The operation is continued until all of the flanks on the right side of the teeth are relieved from the cutting edges, after which the spring 58 and block 61 are interchanged to have the spring 58 positioned on the right hand side of the member 37 to have the right hand flange 46 of the member 47 engage the right hand side of the cam 44.

In this construction the member 37 is oscillated to the right by the cam 44 to move the hollow shaft 31 and its worm 28 to the right to periodically advance the rotation of the worm 29, and the table 23 in a clockwise direction to machine a relief on the left hand sides of the teeth of the hob. At the cutting edge of each tooth the member 37 is in normal position and the rotation of the table 23 and the tool is advanced to have the tool machine the flanks of the teeth inwardly away from the normal flank as described by the lead of the hob thread. The teeth thus formed have flank contour, when compared to the cutting edge, of progressively reduced width. The contour obtaining at all times at the cutting edges as the flutes are widened during the sharpening operation of the teeth, correspond to the corresponding worm as regards mating capacity. While the angle formed by the opposed cutting edges differs after each sharpening it always has the property that when the edges are extended as straight lines, when taken in the axis of the hob, they are always tangent to the same base circle. Thus a constant form is imparted to the wheel flanks.

Figure 2:
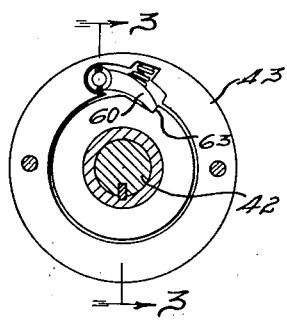
Fig. 2 is an enlarged sectional view of the structure illustrated in Fig. 1, taken on the line 2—2 thereof.
Figure 3:
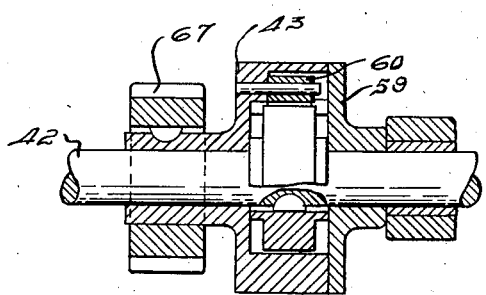
Fig. 3 is an enlarged sectional view of the structure illustrated in Fig. 2, taken on line 3—3 thereof.

Referring to Figs. 1, 2 and 3, I have illustrated the pawl and rack 43 which is employed in conjunction with the shaft 42 for permitting the return movement of the table 23 after the cutter has passed across all of the teeth of the hob. The reverse operation of the shaft 25 drives the housing 59 through the gear train 41 to have a pawl 60 thereof slide from a notch or tooth 63 to permit the reversal of the table 23 without rotating the shaft 42 or the cam 44. After the table has been returned to its original position the reversal of rotation of the shaft 25 causes the pawl 60 to engage the notch 63 to rotate the shaft 42 in synchronization with the rotation of the table 23 to effect the relief on the sides of the teeth as specified above. Collars 64 are screwed on the shaft 42 for positioning the shaft relative to its supporting housing 66 and a collar 65 is employed for locking the gear 67 relative to the shaft by a screw 70 which clamps the split nut 65 thereon.

Referring to Fig. 1, the table 23 is provided with slides 68 and 69 which are movable at right angles to each other by the lead screws 71 and 72, respectively, for the purpose of setting up the tool relative to the work. After the tool has been advanced to cut a groove in the hob which is of less width than the gap to be provided between the threads of the finished work, the flanks of the threads are then machined to proper dimensions through the angular adjustment of the carriage 23 which may be effected by the adjustment of screws 74 and 75, the ends of which engage a lug 76 projecting from the bottom of the table or by means of screws 62 or by means of a cam, not shown, similar in principle to the action of cam 44 utilized for "backing off" purposes. By this means the cutting tool or tools or grinding element are revolved about a center which is fixed relative to the central axis of the work, and corresponding substantially to the center distance of the gear set. The result of this operation is to provide a hob having threads thinner than the corresponding worm threads but having identical mating capacity.

I have also provided an index adjustment 77 for the table by which the lead screw 71 may be set at a predetermined angle which is such as to have the sides of the cutter parallel to the sides of the teeth of the work so that the cutters may be periodically advanced to cut a portion of the sides of the teeth when the teeth are of exceedingly coarse pitch. This relieves the machine from the strain to which it would be subjected when a cut is taken across the entire width of the tooth at a single setting. In either arrangement the camming mechanism is employed when machining a hob for providing the relief to the teeth rearwardly of the cutting edges.

When a hob is provided with a plurality of threads I employ an indexing head illustrated in Figs. 1, 13, 14 and 15, by which the shaft 26 is adjusted relative to the shaft which supports and drives the work piece, to so relatively adjust the shaft and work piece as to position a second thread adjacent to the cutting tool. The shaft 26, which supports and drives the work piece, is connected to the driving shaft 79 through the medium of a pair of discs 80 and 81. The disc 80 is an extending flange on the hollow shaft 79 and is provided with a plurality of notches 82 herein illustrated as being four in number to be employed when one, two or four threads are provided on the hob. The notches are engageable by a tenon 83 carried by a sliding member 84 mounted in a slot 85 in the disc 81 and attached to the shaft 26 by a key 86. A handle 87 is pivoted on the extension 88 of the disc 81 and is pivotally attached to the slide 84 by a pin 89, the outer end of which engages one end of a spring 91 which is attached by a lug 92 to the disc 81. The spring 91 biases the slide 84 and therefore the tenon 83 into engagement with the slot 82 for effecting the rotation of the shaft 26 through the driving shaft 79 for rotating the hob.

The tool 94, illustrated in Fig. 1 is supported in a housing 95 along with an adjacent tool which is spaced therefrom and mounted in such manner as to have the cutting sides tangent to the same base circle to which the side of the hob thread is tangent. The method of mounting the cutters 94 in the housing 95 is described and claimed in the co-pending application of G. R. Scott filed November 2, 1931 Serial Number 572,527, which is a preferred form of construction. It is to be understood, however, that conventional cutters known in the art to be suitable may be employed with my machine herein described and illustrated.

Referring to Figs. 11 and 12 I have illustrated a grinding attachment which may be substituted for the housing 95 and the tools 94 when it is desired to finish the sides of the teeth with a grinding operation. A standard 96 is mounted on the table 69 which supports a bearing 97 in which a pencil stone 98 is mounted for rotational movement when driven by a motor 99 mounted on an extension of the standard. Suitable pulleys and belts 100 are employed for connecting the motor to the pencil stone 98 which is advanced by the carriage and the cam mechanism to accurately grind the sides of the teeth to predetermined form with the relief hereinabove referred to, provided rearwardly of the cutting edges. It is to be understood that I have shown a pencil stone 98 for the purpose of illustration only and that other types of stones of disc, conical or other shape may be substituted therefor for grinding the flanks of the teeth.

While I have illustrated and described but a single embodiment of my invention it will be apparent to those skilled in the art that various changes, omissions, additions and substitutions may be made therein without departing from the spirit and scope of my invention, as set forth in the accompanying claims.

I claim:

1. Apparatus for producing hobs comprising a rotatable work piece support and a tool carrying table which is rotatable in synchronism therewith, means for feeding said tool toward said work piece, means for feeding said tool angularly thereof, and means for advancing and retracting the rotation of the table at predetermined intervals.

2. Apparatus for producing hobs comprising a rotatable workpiece support and a tool carrying table which is rotatable in synchronism therewith, of additional means in synchronism with the rotation of said table for periodically advancing or retracting its rotation, relative to the rotation of the work piece.

3. Apparatus for producing hobs comprising a workpiece which is mounted for rotational movement and a tool carrying table which is rotatable in synchronism therewith, of means for adjusting the tool relative to said work piece, means for adjusting said table angularly relative to said workpiece, and means for advancing and retracting said table periodically during the uniform rotation of the work piece.

4. The combination with a machine for cutting a thread in a work piece having a rotatable support therefor and a tool carrying table which is rotatable in synchronism therewith, of means for advancing the tool relative to the work piece for machining a groove therein, means for advancing the tool angularly about the center of the table for machining the sides of the groove to form a thread having sides of predetermined contour, said thread having grooves cut thereacross in angularly disposed relation to the gap therebetween for forming a plurality of teeth, and means for periodically advancing and retracting the table angularly during the side machining operation of the teeth for relieving the side cutting edges thereof.

5. The combination with a machine for cutting a thread in a workpiece which is rotatably supported and a tool carrying table which is rotatable in synchronism therewith, of means for advancing the tool relative to the workpiece for machining a groove therein, and means for advancing and retracting the tool angularly about the center of the table, for machining the sides of the groove to form a thread having sides of predetermined contour, the extensions of which at the cutting edge of the tool are tangent to a base circle concentric with the said center.

6. Apparatus for producing hobs comprising a rotatably supported workpiece and a tool carrying table which is rotatable in synchronism therewith, means for feeding said tool laterally of said workpiece to establish depth and means for feeding said tool angularly of said workpiece about a center which is concentric with a base circle defined by the cutting edges of said tool to establish width and co-related means for periodically introducing an angular feed for releasing the flanks thereof.

7. The combination with a machine for cutting a thread in a workpiece which is rotatably supported and a tool carrying table which is rotatable in synchronism therewith, of a longitudinally slidable worm for driving said table, an arm having an adjustable pivot for moving said worm longitudinally a predetermined amount, and a cam rotatable in synchronism with said work piece for actuating said arm at predetermined intervals for interrupting the uniform rotation of said table.

8. The combination with a machine for cutting a plurality of teeth on a hob of the globoidal type including rotatable supporting means therefor and a tool carrying table rotatable in synchronism therewith, of a tool mounted on said table for cutting a thread in said hob which is divided into a plurality of teeth by longitudinally extending grooves, and means for relieving the sides of the teeth from the cutting edges which includes the angular advancing and/or retracting of the table during its rotation.

9. The combination with a machine for cutting a plurality of teeth on a hob of the globoidal type including rotatable supporting means therefor and a tool carrying table rotatable in synchronism therewith, of a tool mounted on said table for cutting a thread in said hob which is divided into a plurality of teeth by longitudinally extending grooves, and means for advancing and retracting the tool angularly to machine the sides of the teeth, and means for relieving the sides rearwardly from the cutting edges which includes the angular advancing and/or retracting of the table during its rotation.

10. A machine for cutting a thread in a hob of the globoidal type, having a rotatable supporting mechanism for said hob and a tool supporting table rotating in synchronism therewith, of an indexing device associated with said mechanism for positioning said hob relative to said tool at a plurality of points, for cutting a plurality of threads therein which are intersected by a plurality of grooves forming teeth, means for adjusting said tool angularly relative to said teeth for machining the side thereof, and means for periodically changing relative rotative position of said table during the machining of each tooth side for relieving the sides of the teeth from the front cutting edges.

11. The method of relieving the teeth in hobs of the enveloping type comprising the rotating of a hob blank and a former on axes perpendicular to each other and effecting the relief from the cutting edges towards the back of the teeth by changing the relative rotative positions of the elements while maintaining a fixed distance between the said axes of rotation.

12. A machine for relieving the teeth in a hob of the enveloping type having a rotatable supporting mechanism for said hob and a former supporting table rotating in synchronism therewith; means for changing the relative rotative position of said hob and former for the purpose of imparting the desired relief to said hob teeth from the front cutting edges while maintaining a fixed distance between the axes of rotation.

13. The method of relieving the teeth in hobs of the enveloping type which includes the steps, of mounting the hob and a former on axes which are perpendicular to each other, of rotating the axes in timed relation, and of advancing and/or retracting the rotation of either axis for sloping the sides of the teeth of the hob away from the front cutting edges.

14. A machine for constructing and relieving the teeth in hobs of the enveloping type which includes, a rotatable support for said hob element, a former, a rotatable support for said former the axis of which is perpendicular to the axis of the hob support, mechanism for rotating said supports in synchronism, means for angularly advancing said former while maintaining fixed centers for machining the sides of the teeth of the hob, and means for interrupting the synchronized rotation of the supports for relieving the sides of the teeth from the front cutting edges.

15. The method of producing hobs including rotating a blank element and a former element in a timed relation about axes which are non-intersecting and non-parallel, forming the blank element by changing the normal relative rotative positions of said elements, and relieving the sides of the hob teeth by interrupting the relative timed rotation therebetween.

16. The method of producing hobs consisting in rotating a blank and former in timed relation on axes perpendicular to each other, forming the hob teeth by changing the normal relative rotative positions of said blank and former, and providing relief to the hob teeth by periodically interrupting the said timed rotative relation.

17. Apparatus for producing hobs including, in combination, means for rotating a blank and a former in timed relation about axes perpendicular to each other, means for changing the normal relative rotative positions of said elements for forming the hob teeth, and means for periodically interrupting said timed rotation to effect a relief on said teeth rearwardly from the cutting edge.

18. Apparatus for relieving the teeth of hobs including, in combination, a rotatable work piece support, a tool carrying table rotatable in synchronism therewith, and means for advancing and retarding the relative rotative movement between the table and support for effecting the relief to said teeth.

19. Apparatus for relieving the teeth of hobs including, in combination, a rotatable work piece support, a tool carrying table rotatable in synchronism therewith, and means for periodically changing the relative rotative movement between the table and support for effecting the relief to said teeth.

GEORGE R. SCOTT.